Sept. 19, 1950
G. C. FRANCIS ET AL
REFLECTING MEANS FOR LIMITING
VISION OF AIRCRAFT PILOTS
Filed July 21, 1948
2,522,938
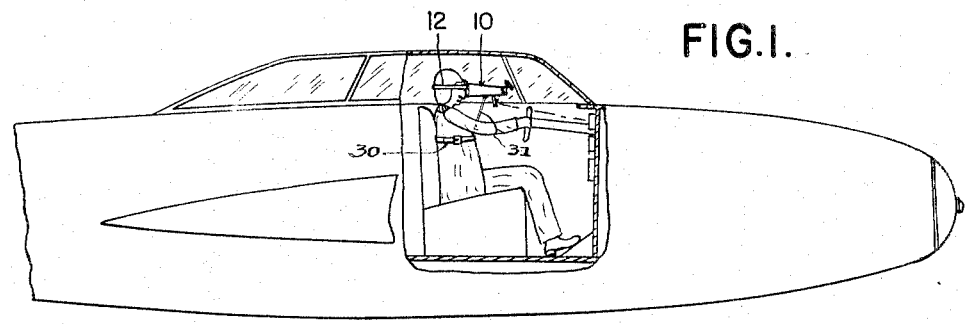
FIG.1.
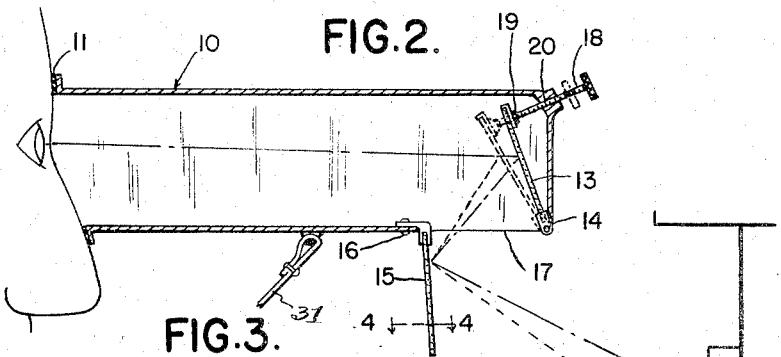
FIG.2.
FIG.3.
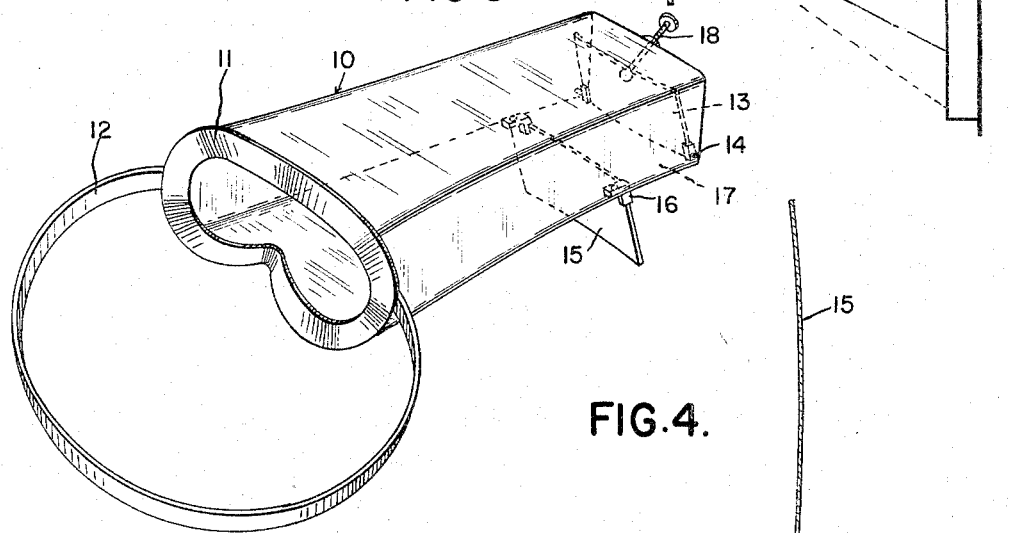
FIG.4.
*INVENTORS*
GERALD C. FRANCIS
BY  NED T. PATTERSON
*Hawke & Hardesty*
ATTORNEYS Patented Sept. 19, 1950

2,522,938

UNITED STATES PATENT OFFICE 2,522,938

REFLECTING MEANS FOR LIMITING VISION OF AIRCRAFT PILOTS

Gerald C. Francis and Ned T. Patterson, Lansing, Mich.

Application July 21, 1948, Serial No. 39,986

6 Claims. (Cl. 88—68)

1

The present invention relates to the art of instructing and checking pilots in aircraft operation by instrument, commonly referred to as instrument flying, and more particularly is concerned with means for limiting the pilot's vision so that the instrument panel only is visible.

In instrument flying and in the training of pilots, as well as when undergoing tests in the presence of an instructor or inspector, it is necessary to either provide a plane with a cockpit which can be completely covered or to employ certain polarized glass which prevents the pilot from seeing out of the cockpit. To do this, it is necessary that the pilot wear polarized goggles as will prevent him seeing out of the cockpit. The inspector or co-pilot does not wear these goggles but his vision is somewhat impaired by the polarized or colored glass covering of the cockpit.

It is the object of this invention to eliminate the necessity for such complicated installations by providing a convenient accessory which can be worn by the pilot and which limits his field of vision solely to the instrument panel. This accessory comprises means which can be readily adjusted to limit the vision of the pilot to the instrument panel, and prevent him seeing anything else, but the vision of the co-pilot or instructor or inspector is not impaired in any way.

For a more detailed understanding of the invention reference may be had to the accompanying drawing illustrating a preferred embodiment thereof, and in which Fig. 1 is a side elevational view of an airplane with parts broken away showing a pilot in position and using the viewer constructed in accordance with the invention.

Fig. 2 is an enlarged vertical longitudinal sectional view through the viewer illustrating its internal construction and showing same clamped to the pilot's face for use.

Fig. 3 is a perspective view of the viewer, and

Fig. 4 is a sectional view taken on the line 4—4 of Fig. 2, and showing more clearly a convex mirror structure which may be used to widen the field of vision if desired.

The preferred embodiment of this invention comprises a tubular opaque casing 10 constructed of plastic or other suitable opaque material and of any desired cross sectional shape. One open end of said casing is formed to fit the contour of the pilot's face and carries a rubber or felt pad 11 conforming to the face contour, so that when the same is clamped on the face by means of an elastic band 12, the pilot's vision is completely cut off at this point. The tubular casing is preferably constructed rectangular in cross-section and the other end of the casing is preferably closed, a mirror 13 being pivotally supported as at 14 to the casing, and arranged to reflect the line of vision against a second mirror 15 secured in any suitable manner as at 16 to the casing and depending therefrom as clearly illustrated in Fig. 2.

This casing 10 is provided with an opening 17, adjacent the forward end thereof and mirror 13 is supported within the casing and located forwardly of this opening, while mirror 15 is supported rearwardly of this opening. The mirror 13 faces rearwardly, while mirror 15 faces forwardly. An adjusting screw 18 is supported or carried on said mirror 13 by a conventional ball and socket connection 19, and the adjusting screw is threaded in an opening 20 of the casing. The mirror 13 can thus be adjusted to vary its annular relation with respect to mirror 15.

As seen in Fig. 4, the mirror 15 may be arranged convex or flat in one place, this convex mirror construction serving to widen the field of vision of the pilot in one direction only. This is so that the pilot when sitting in the cockpit can with the use of this instrument view the entire instrument panel. Obviously, a convex mirror is not always necessary, and a flat mirror may often be used. Adjustment of the annular relation of these mirrors will adjust the instrument for pilots of different heights and for use with aircraft in which the instrument panels are either lower or higher. In other words, adjustment of mirror 13 will raise or lower the field of vision.

The length and dimensions of the casing are more or less determined by the dimensions of the instrument panel, it being preferably that the field of vision be limited to encompass the instrument panel only, and so constructed to permit the pilot to see the entire width of the instrument panel with little or no sidewise movement of the head.

Such an instrument as herein described is particularly applicable and desirable for use in routine instrument instruction and practice flying, all pilots being required to compile a minimum number of hours of instrument flying to secure and maintain their pilot's license, and to periodically pass tests before an inspector.

The above instrument is particularly useful during instruction and inspection because the co-pilot or inspector has clear vision, while the student or pilot has only a limited vision, and can only see over the cockpit if he raises his head an abnormal amount. If a pilot did raise his head so as to see over the cockpit, the inspector would readily spot this action. However, it is preferable to provide a harness 30 which may be secured in any suitable manner to the pilot and secure the instrument by a suitable adjustable restraining strap 31, so as to positively prevent any accidental raising of the instrument when in use, and insuring a positive control of the pilot's vision.

While only one form of the invention has been described, it will be apparent to anyone skilled in the art to which this invention pertains that various modifications and changes in design and construction may be made without departing from the spirit of the invention or from the scope of the appended claims.

We claim:

1. In the art of instructing and checking pilots in aircraft operation by instruments, a portable instrument means for limiting the vision of the pilot to the instrument panel and comprising a casing having opaque walls and open ends, means for securing one open end of said casing to the pilot's face and enclosing the pilot's eyes, and reflecting means at the other end of said casing comprising reflecting surfaces facing each other, said casing having an opening intermediate said reflecting surfaces adjacent said other end, one of said reflecting surfaces depending from said casing and facing the instrument panel, said casing being of limited length whereby to avoid obstructing the view of said instrument panel by an instructor and whereby the pilot's line of sight when viewing the instrument panel is substantially horizontal.

2. In the art of instructing and checking pilots in aircraft operation by instruments, a portable instrument means for limiting the vision of the pilot to the instrument panel of an aircraft without obstructing the view of said instrument panel by an instructor and comprising a casing having opaque walls and open ends, means for securing one end of said casing to the pilot's face and enclosing the pilot's eyes, and reflecting means at the other end of said casing, said casing having an opening on the under side adjacent said other end, said reflecting means comprising a mirror facing rearwardly at the end of said casing remote from the open end next the pilot's face, and a second mirror facing forwardly and depending from said casing, and means for adjusting the angularity of at least one of said mirrors relative to the casing, whereby to adapt said portable instrument means for the individual pilot using the same, and to thereby restrict the pilot's vision to said instrument panel when the pilot's line of sight is substantially horizontal.

3. In the art of instructing and checking pilots in aircraft operation by instruments, a portable instrument means for limiting the vision of the pilot to the instrument panel of an aircraft without obstructing the view of said panel by an instructor and comprising a casing having opaque walls and open ends, means for securing one open end of said casing to the pilot's face and enclosing the pilot's eyes, and a reflecting mirror structure assembly at the other end of said casing, said casing having an opening on the under side adjacent said other end, said mirror structure assembly comprising a mirror facing rearwardly at the end of said casing remote from the open end next the pilot's face, and a second mirror depending from said casing and facing toward said instrument panel, said first mirror supported forward of the opening and said second mirror supported to the rear of the opening.

4. In the art of instructing and checking pilots in aircraft operation by instruments, a portable instrument means for limiting the vision of the pilot to the instrument panel of an aircraft without obstructing the view of said panel by an instructor and comprising an open ended casing having opaque walls, means for securing one open end of said casing to the pilot's face and enclosing the pilot's eyes, and a reflecting mirror structure assembly at the other end of said casing, said casing having an opening on the under side adjacent the open end most remote from the eyes, said mirror structure assembly comprising a mirror facing rearwardly at the end of said casing remote from the open end next the pilot's face, and a second mirror facing said instrument panel and depending from said casing, said first mirror supported forward of the opening and said second mirror supported to the rear of the opening, and means adjusting the angular relation of at least one of said mirrors relative to the casing, whereby to adapt said portable instrument means for the individual pilot and to thereby confine the pilot's vision to the instrument panel when the pilot's line of sight is substantially horizontal.

5. In the art of instructing and checking pilots in aircraft operation by instruments, a portable instrument means for limiting the vision of the pilot to the instrument panel of an aircraft without obstructing the view of said panel by an instructor and comprising an open end casing having opaque walls, means for securing one end of said casing to the pilot's face and enclosing the pilot's eyes, and a reflecting mirror structure assembly at the other end of said casing, said casing having an opening on the under side adjacent said other end, said mirror structure assembly comprising a mirror facing rearwardly at said other end of the casing and a second mirror depending from said casing and facing forwardly toward said instrument panel, at least one of said mirrors being adjustably mounted on said casing to raise or lower the field of vision as viewed through said casing, said second mirror being convex to widen the field of vision.

6. In the art of instructing and checking pilots in aircraft operation by instruments, a portable instrument means for limiting the vision of the pilot to the instrument panel of an aircraft without obstructing the view of the panel by an instructor and comprising an open end casing having opaque walls, means for securing one open end of said casing to the pilot's face and enclosing the pilot's eyes, and a reflecting mirror structure assembly at the other end of said casing, said casing having an opening on the under side adjacent the end remote from the eyes, said mirror structure assembly comprising a mirror facing rearwardly at the end of said casing remote from the open end next the pilot's face and cooperating with a second mirror facing forwardly and depending from said casing, the first mirror supported forward of the opening and said second mirror supported to the rear of the opening, and means adjustably mounting one of said mirrors on said casing to raise or lower the field of vision as viewed through said casing, said second mirror being convex to widen the field of vision, the longitudinal length of said casing and the relationship of the mirrors with respect to the eye being such as to limit the field of vision to a predetermined height and width as determined by the height and width of the instrument panel, and to confine the pilot's vision to said instrument panel when the pilot's line of sight is substantially horizontal.

GERALD C. FRANCIS.
NED T. PATTERSON.

REFERENCES CITED

The following references are of record in the file of this patent:

UNITED STATES PATENTS

| Number | Name | Date |
|---|---|---|
| 631,227 | Peppard | Aug. 15, 1899 |
| 1,166,343 | Fielding | Dec. 28, 1915 |
| 1,236,265 | Casson | Aug. 7, 1917 |
| 1,313,262 | Compere | Aug. 19, 1919 |
| 1,356,708 | Goodyear | Oct. 26, 1920 |
| 1,451,096 | Hagen | Apr. 10, 1923 |
| 1,748,624 | Shivley | Feb. 25, 1930 |
| 1,885,744 | Malcom | Nov. 1, 1932 |
| 2,090,132 | Lacoe | Aug. 24, 1937 |
| 2,255,197 | Thomas | Sept. 9, 1941 |
| 2,257,510 | Mote | Sept. 30, 1941 |
| 2,322,770 | Ocker | June 30, 1943 |
| 2,343,473 | Pierson | Mar. 7, 1944 |
| 2,359,994 | Klemperer | Oct. 10, 1944 |
| 2,425,522 | Ellis | Aug. 12, 1947 |